United States Patent

[11] 3,628,565

| [72] | Inventors | Irvin E. McWethy<br>Oxford, Ohio;<br>Bjorn O. Beck, Richmond, Ind. |
|---|---|---|
| [21] | Appl. No. | 16,095 |
| [22] | Filed | Mar. 3, 1970 |
| [45] | Patented | Dec. 21, 1971 |
| [73] | Assignee | Philco-Ford Corporation<br>Philadelphia, Pa. |

[54] FLEXIBLE CHECK VALVES
7 Claims, 4 Drawing Figs.

[52] U.S. Cl................................................... 137/525.3,
137/515.5
[51] Int. Cl................................................... F16k 15/16
[50] Field of Search........................................ 137/525.3,
525, 515.5

[56] References Cited
UNITED STATES PATENTS

| 3,176,712 | 4/1965 | Ramsden..................... | 137/525 |
| 3,073,339 | 1/1963 | Stelzer........................ | 137/525 |
| 3,422,844 | 1/1969 | Grise........................... | 137/525.3 |

*Primary Examiner*—Laverne D. Geiger
*Assistant Examiner*—William H. Wright
*Attorney*—Carl H. Synnestvedt

ABSTRACT: Check valve apparatus for controlling fluid flow, comprising a flexible "flapper"-type valve member and a tubular valve-receiving collar including an internal annular valve seat. The collar is apertured around a portion of its periphery to accommodate insertion of the flexible valve laterally of the direction of fluid flow. Mounting of a hose over the collar, and clamping of the hose thereon, provides a seal and completes the assembly.

INVENTORS
IRVIN E. McWETHY
BJORN O. BECK
BY

Carl H. Lynnestvedt
AGENT

FLEXIBLE CHECK VALVES

BACKGROUND OF THE INVENTION

In certain fluid control apparatus, particularly the water recirculation and pumpout circuits of a laundry washing machine, it has been common to use check valves, or partial restrictor valves, fabricated of rubber, neoprene, or other flexible material. Frequently a number of such valves are used in a laundry machine and each check valve or restrictor, and the collar which provides its seat, has required time consuming individual assembly with a fitting, for example a T-connection in the flow control circuit. Such known flapper valves have proven to be relatively expensive, from the standpoint of both construction and assembly, and present problems when it is necessary to replace them.

SUMMARY OF THE INVENTION

It is the general objective of our invention to provide low-cost check valves and restrictors, by substantially simplifying assembly of the valve and seat structure and providing for mounting thereof in the fluid control circuit without the use of screws or fasteners. This is accomplished by providing a novel hose-receiving collar fitting, having a peripheral aperture so disposed with respect to a valve seat formed in the collar, that a flexible valve member can readily be inserted into the collar in position to confront the valve seat. Forcing a hose over the collar at the valve installation position seals the valve in the conduit as well as physically retaining it therein. Conveniently, suitable clamp means, for example a conventional spreadable clamping ring, is used to hold the hose on the conduit.

The apparatus is inexpensive, easily replaceable, causes no interference with the circulation hose, and minimizes the possibility of the valve member being drawn or forced through the valve seat.

DESCRIPTION OF THE PREFERRED EMBODIMENTS

Figure 1:
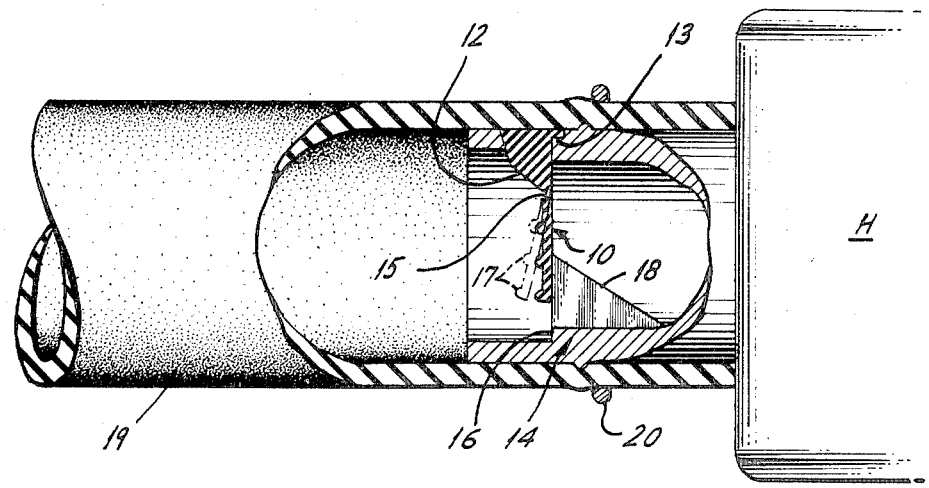
FIG. 1 is a fragmentary, side-elevational view, with portions broken away, illustrating a valve and collar and the manner in which the hose is used to seal and retain the valve.

Two embodiments are illustrated. One shown in FIGS. 1 to 3 comprises a restrictor the impedance of which varies as a function of the direction of fluid flow, whereas the form shown in FIG. 4 comprises a full check valve. First making detailed reference to FIGS. 1 and 2, the illustrated restrictor valve 10 comprises a body or member of flexible material, for example, rubber or neoprene. The member is generally circular (see FIG. 2) and relatively thin, although it is of substantial thickness in an arcuate sector 11 defining a retaining portion 12, which includes a flange 13 shaped to fit closely within a cutout seating area 13a (FIG. 3) provided in a conduit or collar 14. The collar 14 may be formed of a suitable material such as polypropylene, and, as shown, may constitute an extension of a housing H. Where the apparatus is embodied in a laundry washing machine, such a housing normally would enclose a drain pump. The collar has an opening 4a through its cylindrical sidewall, providing an aperture in said wall subtending a chord of a length slightly less than the width of said valve member to ensure that the valve member, inserted in the fashion described below, will be retained securely in the collar. As shown at 16, the collar also has an internal annular shoulder against which the restrictor member 10 seats when flow is in the nonimpeding direction, that is, from the pump toward the restrictor.

Figure 2:
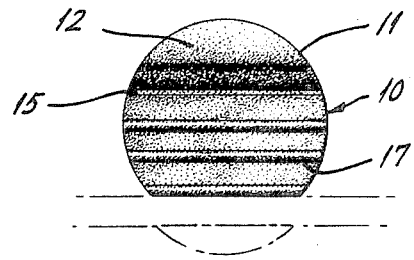
FIG. 2 is a forward elevational view of the flexible valve member which, in this embodiment, is configured to present a desired degree of restriction rather than comprising a complete check valve.
Figure 3:
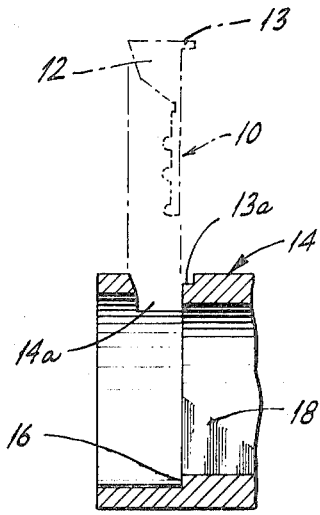
FIG. 3 is a sectional view of a portion of the apparatus of FIG. 1, with the valve member removed from its seat.

To promote flexure of the flexible restrictor member 10 it is of reduced cross section in an upper zone 15 which extends across the member in a horizontal direction, when said member is viewed as shown in FIG. 2. As illustrated by broken lines in FIG. 1, the restrictor flexes along zone 15, and also throughout its height, when subjected to liquid flow in the nonimpeding direction. Several ribs 17 are formed across the face of the restrictor, preferably extending in general parallelism with the zone of reduced cross section. Such ribs permit flexing of the restrictor toward open position while resisting collapse of the same when flow is in the impeding direction, that is, from the left as the assembly is viewed in FIG. 1. As suggested in broken line at the lower portion of FIG. 2, the degree of restriction, when flow is in the impeding direction, can be established very readily by removing a portion of the member 10, preferably by clipping the same horizontally along one of the ribs 17. As is well known, such a valve presents a restriction which is a function of the direction of liquid flow.

Such a partial restrictor may require more support than that which is afforded by contact of the member against the shoulder 16. If this is the case a triangularly shaped support may be provided by molding the same on the inside of the tube, as shown at 18, in a position in which its radially extending face makes contact with the member 10 when the latter is in closed position.

Figure 4:
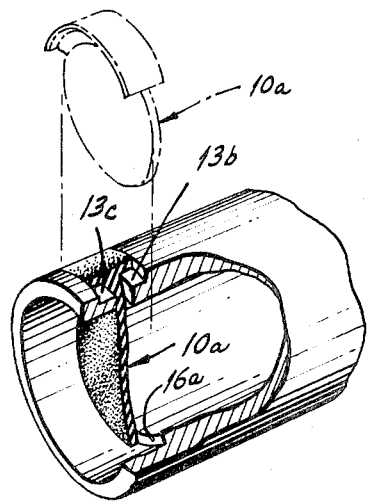
FIG. 4 is a perspective illustration of another form of valve, showing the manner in which it is applied to the collar.

The invention is particularly characterized by the ease with which such valves and restrictors may be assembled and disassembled. This is a feature of both of the illustrated embodiments, and appears to good advantage in FIG. 3, and also in the embodiment of FIG. 4 in which the resilient valve member serves as a complete check valve. As shown in the embodiment of FIG. 4 the check valve member 10a, in its closed position, has contact with its circumferential seating shoulder 16a throughout the entire length of the shoulder. Because of this extended contact no ribs have been provided in the embodiment of FIG. 4. However it will be understood that such ribs may be desirable if the check valve is of substantial area or if high pressures will be encountered.

Valves of the kinds shown in both embodiments are readily assembled without the use of screws or the like. For this purpose (referring particularly to FIGS. 3 and 4) the wall of the collar is slotted throughout an arcuate sector slightly shorter than the diameter of the valve member. The flexible member is flexed sufficiently to permit insertion through the slot, in the manner suggested by broken lines in FIGS. 3 and 4, until its flanging seats against the arcuate recess provided in the collar. As shown in the embodiment of FIG. 4 oppositely extending flanges may be provided when desired, and these interfit with a pair of confronting flange seating areas shown at 13b and 13c. Whether resort is had to this type of flange construction or to the single flange arrangement, shown in FIGS. 1 and 3, will depend upon the useage to which the valve is to be subjected.

A hose 19 (FIG. 1) is fitted over the open end of the valve-receiving collar. The hose bears against the valve retaining portion 12, covers the slot through which the valve was inserted, holds the valve in place and seals the opening against leaks. Use of a friction clamping ring 20, of known type, completes the assembly. It will be noted that the free end of the collar extends far enough into the hose to provide a relatively rigid tube of fixed diameter in which the valve moves without interference.

In use, the apparatus of this invention functions in manner similar to that of flexible check valves or restrictors known heretofore, particularly in the laundry trade. A pressure differential across the valve, in one direction, seats the valve and prevents flow or impedes the same, depending upon the configuration of the flexible member. Flow in the opposite nonimpeding direction flexes the member to open position, thereby reducing or substantially eliminating the impedance.

While two embodiments have been shown and described, it should be understood that the term "check valve," as used in the appended claims, contemplates both embodiments as well as reasonable equivalents thereof.

We claim:

1. In check valve apparatus of the kind comprising a fitting or conduit for receiving a hose thereover and having an internal annular valve-seating shoulder, and a flexible valve member within said conduit cooperable with said shoulder to control flow of fluid through the conduit in accordance with the direction of fluid flow, the improvements which comprise: provision of an aperture in a portion of the periphery of the wall of said conduit, said aperture accommodating insertion of said flexible valve member into said conduit, in position confronting said shoulder, and ready removal of the same; the wall of said conduit having a recessed area adjacent said aperture and facing exteriorly of said conduit; and said valve member having flange means which lies within said recessed area, exteriorly of said conduit, when said valve member is disposed within said conduit, said flange means fitting with said recessed area so that mounting of a hose over the conduit, at the valve installation position, seals the valve in the conduit as well as insuring retention of said flange means in said recess.

2. Check valve apparatus in accordance with claim 1, and further characterized in that said flange means comprises a pair of flanges projecting in opposite directions from said valve member and each retained within a portion of said recessed area.

3. Check valve apparatus in accordance with claim 1, and further characterized in that said conduit is cylindrical in cross section, said valve member is generally circular, and said flange means and the aperture in said conduit are so shaped and disposed that said flange means lies generally flush with the exterior surfaces of said conduit in a position to contact the interior wall surface of a mounted hose.

4. Check valve apparatus of the kind comprising a cylindrical conduit having an internal annular valve-seating shoulder, and a flexible generally circular valve member cooperable therewith to control flow of liquid through the conduit in accordance with the direction of liquid flow, the improvements which comprise: provision of an aperture extending around a portion of the periphery of the wall of said conduit and providing for insertion of said flexible valve member into said conduit in position confronting said shoulder, and ready removal of the same; said valve member having a mounting portion with a dimension, in the direction of the axis of said conduit, substantially greater than the thickness of said member, said mounting portion contacting the walls defining said aperture; and a hose mounted over the conduit, extending across and in contact with said mounting portion and retaining and sealing the valve in the conduit.

5. Check valve apparatus in accordance with claim 4, and in which said mounting portion included flange means overlying conduit exterior wall portions adjacent said aperture, and said hose extends across and in contact with said flange means.

6. Check valve apparatus in accordance with claim 4, and in which said flexible valve member, in one dimension, extends across less than the full diameter of said conduit and serves as a restrictor the impedance of which is a function of the direction of liquid flow.

7. Check valve apparatus in accordance with claim 6, and in which said valve member has an elongated zone of reduced cross section about which it may flex and at least one strengthening rib extending across its face in general parallelism with said zone.

* * * * *